United States Patent [19]

Yaniger

[11] Patent Number: 4,798,685

[45] Date of Patent: Jan. 17, 1989

[54] PRODUCTION OF BASE-TYPE CONDUCTING POLYMERS

[75] Inventor: Stuart I. Yaniger, Palmdale, Calif.

[73] Assignee: Lockheed Corporation, Calabasas, Calif.

[21] Appl. No.: 920,474

[22] Filed: Oct. 20, 1986

[51] Int. Cl.$^4$ .......................... H01B 1/00; H01B 1/06
[52] U.S. Cl. .................................. 252/500; 252/518; 528/397; 528/422; 525/540
[58] Field of Search ............... 252/518, 500; 528/397, 528/422; 525/540; 524/149, 142, 177, 323, 341, 156, 165, 158, 81

[56] References Cited

U.S. PATENT DOCUMENTS

| | | |
|---|---|---|
| 3,813,264 | 5/1974 | Booth et al. . |
| 3,835,102 | 9/1974 | Shinohara et al. . |
| 4,466,910 | 8/1984 | House ................................ 252/500 |
| 4,466,911 | 8/1984 | House ................................ 525/397 |
| 4,505,845 | 3/1985 | House ................................ 252/518 |
| 4,505,846 | 3/1985 | House et al. ...................... 252/500 |
| 4,511,492 | 4/1985 | Swedo et al. ...................... 528/422 |
| 4,519,940 | 5/1985 | Schroeder et al. . |
| 4,615,829 | 10/1986 | Tamura et al. . |
| 4,620,943 | 11/1986 | Denisevich et al. . |

OTHER PUBLICATIONS

Mol. Cryst. Liq. Cryst., 121, 173 (1985) by A. G. MacDiarmid et al.

*Primary Examiner*—Josephine Barr
*Attorney, Agent, or Firm*—Max Geldin

[57] ABSTRACT

Production of base-type conductive polymers, particularly from the family of conductive polyaniline, by reacting a base-type non-conductive polymer containing carbon-nitrogen linkages, e.g., polyaniline, with an R+ donor compound, where R is an organic group, e.g., methyl iodide, and forming an electrically conductive polymer in which the R groups are covalently linked to the nitrogen atoms of the polymer.

18 Claims, No Drawings

PRODUCTION OF BASE-TYPE CONDUCTING POLYMERS

BACKGROUND OF THE INVENTION

The present invention relates to the production of electrically conductive base-type polymers and is particularly concerned with novel procedure for the production of novel base-type polymers, such as conductive polyaniline, having high electrical conductivity, which are non-diffusing when applied to a non-conductive substrate, do not suffer internal diffusion between conductive and non-conductive regions, do not lose conductivity on contact with water, and have good processability.

The free-base form of polyaniline is electrically non-conductive. Protonic acid doping of polyaniline by reaction of polyaniline with a protonic acid HX where X is, for example, Cl, to produce electrically conductive polyaniline is known, for example, as disclosed in A. G. MacDiarmid, et al, Mol. Cryst. Liq. Cryst. 121, 173 (1985). Conductive polyaniline of this type has been employed in batteries, as disclosed in French Pat. No. 1,519,729.

However, conductive polyaniline produced by protonic acid doping has several disadvantages. Thus, these prior art conductive materials tend toward diffusion when applied to a non-conductive substrate. For example, if one desires to make a conductive polyaniline trace on a non-conductive polyaniline free-base substrate, that trace remains conductively stable only for a very short time, after which it will start spreading until eventually the entire substrate has a constant conductivity.

Further, base-type conductive polymers, as represented by the polyaniline class of conductive polymers, have conductivities which are unstable on contact with water. Stability on contact with water is extremely rare in conducting polymers.

In addition, base-type conducting polymers, such as polyaniline, have poor processability. These polymers tend to be somewhat insoluble powders in the conductive form. The few solvents that will dissolve such powders are substances such as fuming sulfuric acid, which are relatively difficult to handle and often chemically degrade the polymer. Further, if one attempts to cast a film from such conductive polymers, they simply tend to convert into a powder rather than a good stable film.

An object of the present invention is the provision of improved base-type electrically conducting polymers of the class of conductive polyaniline.

Another object of the invention is to provide a process for producing electrically conductive polymers, such as conductive polyaniline, which enables the physical and electrical properties of the conductive polymers to be more readily controlled.

Still another object is the provision of novel procedure for the production of novel highly conductive base-type polymers, such as conductive polyaniline, which do not tend to diffuse when formed on a non-conductive substrate and which do not lose conductivity on contact with water.

Yet, another object of the invention is the production of base-type conductive polymers, such as conductive polyaniline, which have good processability characteristics.

SUMMARY OF THE INVENTION

The above objects are achieved, according to the invention, by the carbocation or other Lewis acid doping of base-type non-conductive polymers, particularly from the family of polyaniline, to produce electrically conductive polymers. This is accomplished by reacting a base-type non-conductive polymer containing carbon-nitrogen linkages with an $R^+$ donor compound, where R is an organic group, such R group being capable of covalently binding to the nitrogens of the polymer, and forming an electrically conductive polymer in which the R groups are covalently linked to the nitrogen atoms of the polymer.

Thus, base-type non-conductive polymers containing a carbon-nitrogen linkage, particularly as represented by the free-base polyaniline, can be reacted with a compound such as $R^+X^-$ or $R_3O^+X^-$, where $R^+$ is a strong donor, i.e., an organic cation such as an alkyl group, e.g., $CH_3^+$, and $X^-$ is a stable anion, such as $I^-$, e.g., as provided by $CH_3I$, to form a polymer salt in which a covalent bond is formed between a nitrogen and the organic R group.

The resulting polymer containing as the essential feature the covalent linkage between R and the polymer has substantially higher electrical conductivity as compared to the prior art conductive base-type polymers, such as conductive polyaniline, prepared by the reaction of, for example, free-base polyaniline, with a protonic acid, such as hydrochloric acid. The conductive polymers of the invention, having the above-noted essential feature of a covalent linkage between R and a nitrogen in the polymer, results in pinning the conductive region, so that when the conductive polymer, e.g., conductive polyaniline of the invention, is applied to a substrate, the region to which the conductive polymer, e.g., in the form of a film, is applied remains conductive, with substantially no diffusion taking place to other regions of the substrate. In addition, the conductive polymers of the invention do not lose conductivity on contact with water, whereas conductive base-type polymers of the prior art, such as conductive polyaniline produced by protonic acid doping, tend to lose conductivity on contact with water. In addition, by tailoring the "R" groups as desired, the properties of the polymer can be varied to provide good processability of the resultant polymer, e.g., the control of the solubility of the polymer in suitable solvents, rendering possible the casting of the conductive polymers of the invention as a film on a suitable substrate.

DETAILED DESCRIPTION OF THE INVENTION AND PREFERRED EMBODIMENTS

The base-type conductive polymers of the invention are prepared by the reaction of a base-type non-conductive polymer containing the carbon-nitrogen linkage with a Lewis acid or material that accepts electrons to form a covalent chemical bond with the polymer. The reaction for producing the electrically conductive organic polymers of the invention can be repesented as follows:

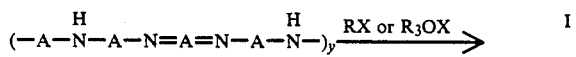

I

-continued

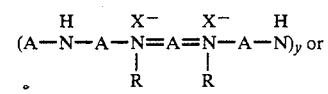 IIA

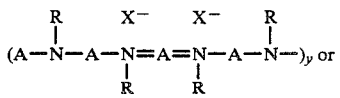 IIB

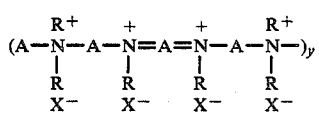 IIC where A is a carbon-containing group, such as aryl, particularly the benzene ring, and including naphthyl and biphenyl, and substituted benzene, naphthyl or biphenyl groups, such as the alkyl substituted derivatives, e.g., 2-methyl biphenyl, butyl naphthalene, 2-methyl aniline, and aryl substituted derivatives, e.g., beta phenyl naphthalene and beta tolyl naphthalene; R is a group which readily forms a covalent bond with nitrogen, such as alkyl, e.g., methyl, ethyl and the like, and aryl, e.g., benzyl, tolyl, xylyl, and other aromatic moieties; X is an anion such as halogen, e.g., $Cl^-$, $I^-$ or $Br^-$, $PF_6^-$, $SbCl_6^-$, substituted and unsubstituted benzene sulfonate, and the like; and y is an integer ranging from about 1 to about 1,000, e.g., about 10 to about 100. When y is in the low end of the above range, e.g., when y is 1 or 2, the materials are known as oligomers and are intended to be included within the term "polymer" employed herein.

The preferred non-conductive polymer employed as the basic polymeric starting material is polyaniline free-base (PFB). This material is reacted according to the above general scheme, with a compound, such as RX or $R_3OX$, in the manner noted below:

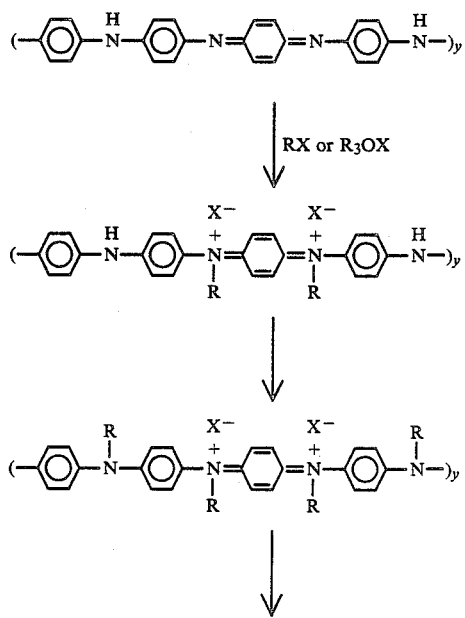

-continued

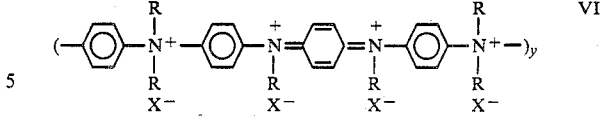 VI

In the above representation of the reaction, R, X and y have the values noted above.

In place of polyaniline containing phenyl groups, as noted above, there can be employed other non-conductive base-type polymeric starting materials of the polyaniline family, containing naphthalene or biphenyl groups, the resulting conductive polymers thus produced according to the invention being analogous base-type conductive polymers containing naphthyl or biphenyl groups, respectively, and wherein the R groups are covalently linked to nitrogen. Such polymeric starting materials can include other non-conductive base-type polymers containing carbon atoms linked to nitrogen, such as cyanogen polymer containing the recurring unit:

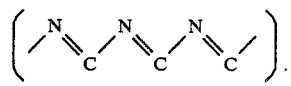

The starting materials of the invention can also include non-conductive mixtures and blends of the above polymers, and copolymers of the above polymers and other polymers, such as a blend of polyaniline and polymethylmethacrylate, and polymer alloys, such as polybenzimidazole-polyimide alloys, containing carbon-nitrogen groups.

Thus, the term "non-conductive polymer" as employed herein is intended to denote any of the above homopolymer or copolymer materials.

The invention will be described hereinafter, however mostly in terms of the use of the preferred non-conductive free-base polyaniline as polymeric starting material for production of the preferred highly conductive polyaniline containing covalently linked R groups to nitrogen.

In carrying out the reaction, the polyaniline free-base is treated with an $R^+$ donor compound, such as RX or $R_3OX$ and the like, where R and X have the definitions noted above. Thus, for example, the reactant which forms a covalent chemical bond with the nitrogens of the polyaniline free-base or equivalent polymer noted above, can be, for example, one of the above $R^+$ donor compounds, such as an alkyl halide, wherein the alkyl group can contain, for example, from 1 to 20 carbon atoms, such as methyl iodide, $(CH_3CH_2)_3O^+SbCl_6^-$, $(CH_3)_3O^+PF_6^-$, $(CH_3)_2CHI$, $(CH_3)_3OSO_3C_6H_4CH_3$ and $CH_3SO_3C_6H_4CH_3$. However, R can also be an oligomeric or polymeric group, e.g., containing from about 20 to about 100,000 carbon atoms, e.g., polyvinyl iodide. The molar proportions of $R^+$ donor compound to non-conductive nitrogen-containing polymer free-base can range from about 0.01 to about 2 $R^+$ groups per nitrogen. In the case of polyaniline, such molar proportions can range from about 0.01 to about 8, per polymer repeat unit.

The reaction can be carried out as a heterogeneous reaction wherein the polymer starting material is not dissolved but is reacted directly with the R-containing reactant, e.g., RX, or the polymer starting material, such as polyaniline free-base, can be dissolved in a suitable solvent which usually does not react with the R-containing donor, e.g., tetrahydrofuran (THF), methylene chloride, acetonitrile and pyridine. However, when employing an $R_3OX$ donor compound, such as $(CH_3)_3OX$ and acetonitrile as solvent, the $(CH_3)_3O^+$ group can react with the $CH_3C\equiv N$ solvent to form

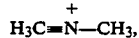

which can also function as a methyl cation donor.

The reaction is generally carried out at about ambient or room temperature, e.g., 20°–25° C., or at higher or lower temperatures.

The rate of reaction can range widely, depending on the particular donor or R-containing reactant employed. Thus, the reaction rate can range from almost instantaneous to several hours or longer.

In the case of polyaniline free-base, this is a high polymer having a molecular weight of the order of 50,000 to 80,000. Lower molecular weight polyaniline can be employed, such as emeraldine, which is an oligomer of polyaniline containing 8 sub-units and having a molecular weight of about 800 to 900. When the free-base is reacted with the "$R^+$" donor, for example, "RX", the R group can be substituted for every hydrogen on the polymeric chain to form the conductive polymer, as represented by Formula V above. Further reaction results in all amine-like nitrogens forming quaternary ammonium groups, as illustrated by Formula VI above. However, the number of covalently bound R groups on the polymer can be controlled by interrupting the reaction at a predetermined time prior to substitution of all of the hydrogen atoms on the polymer with R groups, as illustrated by Formula IV above.

Where the "$R^+$" donor is an "$R_3OX$" donor, an ether, $R_2O$, e.g., dimethyl ether, is given off in the reaction.

The resulting conductive polymer has high conductivity, e.g., 10 to 12 orders of magnitude higher than most polymers. Thus, the conductivity of the invention polymers can be 10 times the value of the conductivity reported for the protonic acid doped polyaniline of the prior art. The conductivity of the invention polymers, e.g., conductive polyaniline, can be varied by reducing or increasing the number of covalently linked R groups, as by controlling the degree of completeness of the reaction, the conductivity increasing with increase in the number of covalently linked R groups.

The physical properties of the highly conductive polymer produced according to the invention can be varied, for example, so as to enhance the processability of the polymer. Thus, one can employ a long chain alkyl group R in the "$R^+$" donor to render the normally insoluble polymer quite soluble. This permits the casting of a film of the conductive polymer on a substrate, rather than formation of a powder, and permits control of the mechanical properties, such as ductility of the polymer.

With the "R" groups covalently linked to the nitrogen atoms in the polymer, all of the groups are pinned, so that when the polymer is applied to a specified region of a non-conductive substrate, the region to which the conductive polymer is applied will remain conductive over an extended period of time without diffusion into adjacent non-conductive regions of the substrate. In addition, the base-type, e.g., polyaniline, conductive polymers of the invention are stable on contact with water. Stability on contact with water is extremely rare in conducting polymers.

The following are examples of practice of the invention:

EXAMPLE 1

Polyaniline free-base was reacted heterogeneously at about 25° C. with a 1 molar solution of $(CH_3CH_2)_3O^+SbCl_6^-$ in $CH_2Cl_2$ for approximately 1 hour. The resultant polymer has a conductivity of about 50 S/cm. (Siemens/cm). This conductivity remains constant after exposure to water.

EXAMPLE 2

Isopropyl iodide $(CH_3)_2CHI$, at a concentration of 1 molar in THF, was reacted at 25° C. with polyaniline free-base (saturated) in THF for 24 hours. A green precipitate formed, which had a conductivity of 0.01 S/cm and was stable in water.

EXAMPLE 3

Polyaniline free-base dissolved in THF (saturated) was treated with 1 molar $CH_3I$ in THF for 12 hours at 25° C. The resulting precipitate showed a conductivity of 0.01 S/cm, and was stable to $H_2O$.

EXAMPLE 4

Polyaniline free-base was treated with $(CH_3)_3O^+PF_6^-$ (1.0 molar) in $CH_2Cl_2$ for 1 hour at 25° C. Dimethyl ether was evolved in the reaction. The resulting polymer had a conductivity of 50.0 S/cm.

EXAMPLE 5

Methyl tosylate, p-$CH_3C_6H_4SO_3CH_3$ (1 molar in THF) was reacted with polyaniline free-base dissolved to saturation in THF, at 25° C. After 12 hours, a green precipitate developed, which was washed in THF. The resulting polymer had a conductivity of 0.05 S/cm and was stable in water.

EXAMPLE 6

A pressed pellet of polyaniline free-base was exposed in one spot to 1.0M $(CH_3CH_2)_3O^+SbCl_6^-$. The resulting conductive polymer spot did not diffuse over a time period of 5 months.

EXAMPLE 7

A film of PFB was exposed to $(CH_3CH_2)_3O^+SbCl_6^-$. Different parts of the film were exposed for different lengths of time, from about 1 second to 1 hour. The resulting film showed a gradient of conductivity, which was stable for more than 5 months.

The base-type electrically conductive polymers of the invention have utility in the production of conductive composites, electronic components, electrical conductors, electrodes, batteries, switches, electrical shielding material, resistors, capacitors, and the like.

From the foregoing, it is seen that by reaction of base-type polymers, such as polyaniline, with certain non-protonic doping agents, the physical and chemical properties of the resulting conducting polymers can be more readily controlled and highly conductive novel polymers obtained.

While particular embodiments of the invention have been described for purposes of illustration, it will be understood that various changes and modifications within the spirit of the invention can be made, and the invention is not to be taken as limited except by the scope of the appended claims.

I claim:

1. A process for producing a conductive polymer which comprises reacting a base-type non-conductive polymer containing carbon-nitrogen linkages and having the formula:

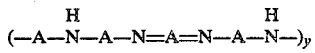

where A comprises an aryl group, and y is an integer ranging from about 1 to about 1,000, with an $R^+$ donor compound selected from the group consisting of RX and $R_3OX$, where R is selected from the group consisting of alkyl containing 1 to 20 carbon atoms, and aryl, and X is selected from the group consisting of halogen, $PF_6^-$, $SbCl_6^-$ and benzene sulfonate, said R group being capable of covalently binding to the nitrogens of said polymer, the molar proportions of $R^+$ donor compound to non-conductive polymer ranging from about 0.01 to about 2 $R^+$ groups per nitrogen, and forming an electrically conductive polymer containing said R groups covalently linked to the nitrogen atoms of the polymer.

2. The process of claim 1, said reaction taking place in a solvent which does not react with said donor compound.

3. The process of claim 1, wherein the base-type non-conductive polymer is selected from the group consisting of polyaniline, its naphthyl and biphenyl derivatives, and alkyl and aryl substituted polyaniline and its alkyl and aryl substituted naphthyl and biphenyl derivatives.

4. A process for producing a conductive polymer which comprises reacting a base-type non-conductive polymer having the general formula:

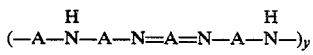

where A comprises an aryl group, with a compound selected from the group consisting of RX and $R_3OX$, where R is selected from the group consisting of alkyl containing 1 to 20 carbon atoms and aryl, X is selected from the group consisting of halogen, $PF_6^-$, $SbCl_6^-$ and benzene sulfonate, and y is an integer ranging from about 1 to about 1,000, the molar proportions of said compound to said non-conductive polymer ranging from about 0.01 to about 2 $R^+$ groups per nitrogen, and forming an electrically conductive polymer having the general formula:

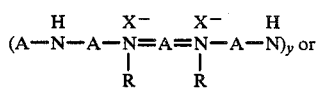

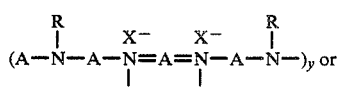

-continued

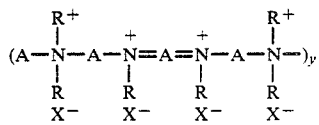

5. The process of claim 4, wherein the base-type non-conductive polymer is selected from the group consisting of polyaniline, its naphthyl and biphenyl derivatives and alkyl and aryl substituted polyaniline and its alkyl and aryl substituted naphthyl and biphenyl derivatives.

6. A process for producing a conductive polymer which comprises reacting polyaniline free-base with a compound selected from the group consisting of RX and $R_3OX$, where R is selected from the group consisting of alkyl containing 1 to 20 carbon atoms and aryl, and X is selected from the group consisting of halogen, $PF_6^-$, $SbCl_6^-$ and benzene sulfonate, the molar proportions of said compound to said polyaniline free-base ranging from about 0.01 to about 8, per polymer repeat unit, and forming an electrically conductive polyaniline having the formula:

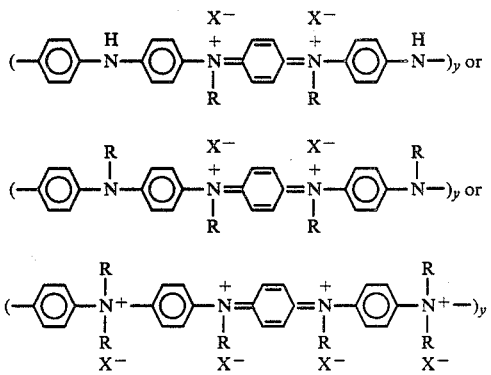

where y is an integer ranging from about 1 to about 1,000.

7. The process of claim 6, said compound selected from the group consisting of $CH_3I$, $(CH_3CH_2)_3OSbCl_6$, $(CH_3)_3OPF_6$, $(CH_3)_2CHI$, $(CH_3)_3OSO_3C_6H_4CH_3$, and $CH_3SO_3C_6H_4CH_3$.

8. The process of claim 7, said reaction taking place in a solvent selected from the group consisting of methylene chloride, tetrahydrofuran, acetonitrile and pyridine.

9. An electrically conductive base-type polymer having the general formula:

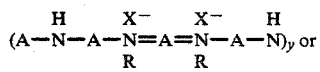

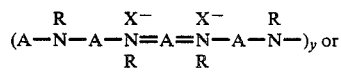

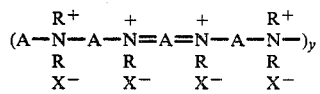

where A comprises an aryl group, R is selected from the group consisting of alkyl containing 1 to 20 carbon atoms and aryl, X is selected from the group consisting of halogen, $PF_6^-$, $SbCl_6^-$ and benzene sulfonate, and y is an integer ranging from about 1 to about 1,000.

10. The electrically conductive polymer of claim 9, wherein the polymer is selected from the group consisting of polyaniline, its naphthyl and biphenyl derivatives and alkyl and aryl substituted polyaniline and its alkyl and aryl substituted naphthyl and biphenyl derivatives.

11. An electrically conductive base-type polymer having the general formula:

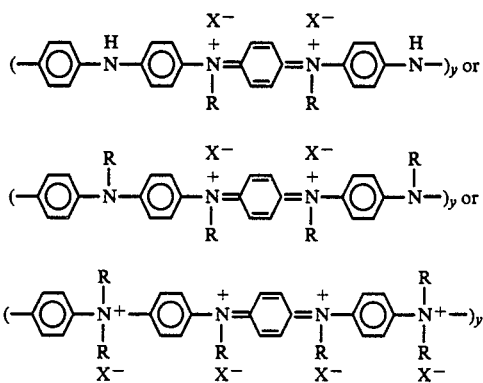

where R is selected from the group consisting of alkyl containing 1 to 20 carbon atoms and aryl, X is selected from the group consisting of halogen, $PF_6^-$, $SbCl_6^-$ and benezene sulfonate, and y is an integer ranging from about 1 to about 1,000.

12. The electrically conductive base-type polymer of claim 11, where R is selected from the group consisting of methyl, ethyl and tolyl.

13. The electrically conductive base-type polymer of claim 11, where y ranges from about 10 to about 100.

14. The process of claim 1, the temperature of the reaction ranging from 20° to 25° C.

15. The process of claim 1, said alkyl groups selected from the class consisting of methyl and ethyl, and said aryl groups of R selected from the class consisting of benzyl, tolyl and xylyl.

16. A process for producing a conductive polymer which comprises reacting a base-type non-conductive polymer containing carbon-nitrogen linkages and having the formula:

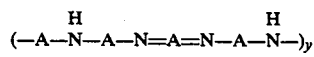

where A comprises an aryl, and y is an integer ranging from about 1 to about 1,000, with an R+ donor compound selected from the group consisting of RX and $R_3OX$, wherein R is an oligomeric or polymeric group containing from about 20 to about 100,000 carbon atoms, and X is selected from the group consisting of halogen, $PF_6^-$, $SbCl_6^-$ and benzene sulfonate, said R group being capable of covalently binding to the nitrogens of said polymer, and forming an electrically conductive polymer containing said R groups covalently linked to the nitrogen atoms of the polymer.

17. A process for producing a conductive polymer which comprises reacting a base-type non-conductive polymer containing carbon-nitrogen linkages and having the formula:

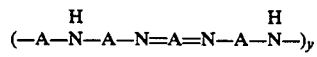

where A comprises an aryl group, and y is an integer ranging from about 1 to about 1,000, with an effective amount sufficient to increase electrical conductivity of an R+ donor compound selected from the group consisting of RX and $R_3OX$, where R is selected from the group consisting of alkyl containing 1 to 20 carbon atoms, and aryl, and X is selected from the group consisting of halogen, $PF_6^-$, $SbCl_6^-$ and benzene sulfonate, said R group being capable of covalently binding to the nitrogens of said polymer, and forming an electrically conductive polymer containing said R groups covalently linked to the nitrogen atoms of the polymer.

18. A process for producing a conductive polymer which comprises reacting polyaniline free-base with an effective amount sufficient to increase electrical conductivity of a compound selected from the group consisting of RX and $R_3OX$, where R is selected from the group consisting of alkyl containing 1 to 20 carbon atoms and aryl, and X is selected from the group consisting of halogen, $PF_6^-$, $SbCl_6^-$ and benzene sulfonate, and forming an electrically conductive polyaniline having the formula:

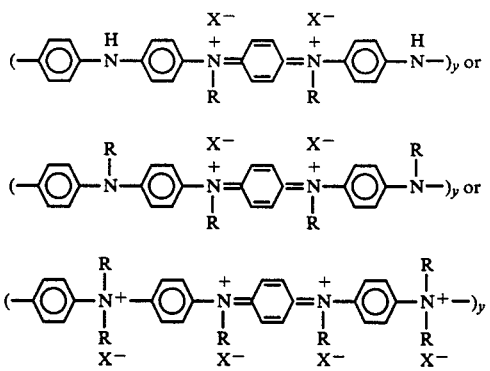

where y is an integer ranging from about 1 to about 1,000.

* * * * *